United States Patent
Nishida et al.

[11] Patent Number: 5,175,581
[45] Date of Patent: Dec. 29, 1992

[54] CAMERA HAVING A BUILT-IN STROBE AND LENS FOR USE THEREWITH

[75] Inventors: Takao Nishida; Osamu Satoh, both of Tokyo, Japan

[73] Assignee: Asahi Kogaku Kogyo Kabushiki Kaisha, Tokyo, Japan

[21] Appl. No.: 726,876

[22] Filed: Jul. 8, 1991

Related U.S. Application Data

[63] Continuation of Ser. No. 412,556, Sep. 25, 1989, which is a continuation of Ser. No. 148,999, Jan. 27, 1988, abandoned.

[30] Foreign Application Priority Data

Feb. 4, 1987 [JP] Japan .................. 62-22451

[51] Int. Cl.⁵ .......................... G03B 15/03
[52] U.S. Cl. .................. 354/413; 354/149.1
[58] Field of Search ........... 354/413, 126, 127, 149.1, 354/149.11

[56] References Cited

U.S. PATENT DOCUMENTS 3,823,411  7/1974  Hasegawa et al. ............ 354/149.1
4,893,140  1/1990  Yamamoto et al. .
4,910,542  3/1990  Yamamoto et al. .
4,978,981  12/1990  Satoh et al. .
4,994,846  2/1991  Kobayashi et al. .
5,012,262  4/1991  Mogamiya et al. .
5,021,814  6/1991  Sato .

Primary Examiner—Russell E. Adams
Attorney, Agent, or Firm—Sandler, Greenblum & Bernstein

[57] ABSTRACT

A strobe built-in camera includes a camera body having a strobe built therein and at least one photographing lens to be detachably mounted on the camera body. The camera comprises a strobe use-warning device for warning unsuitability of use of the strobe in case of the the photographing lens mounted on the camera body reduces a quantity of light emitted from the strobe to a value less than a correct quantity of light to be irradiated upon an object, or that a spreading zone of the light from the strobe is narrower than a field of view of the photographing lens. Therefore, photographing under inappropriate photographing conditions is prevented and superfluous use of films can be avoided.

20 Claims, 10 Drawing Sheets

FIG_1A
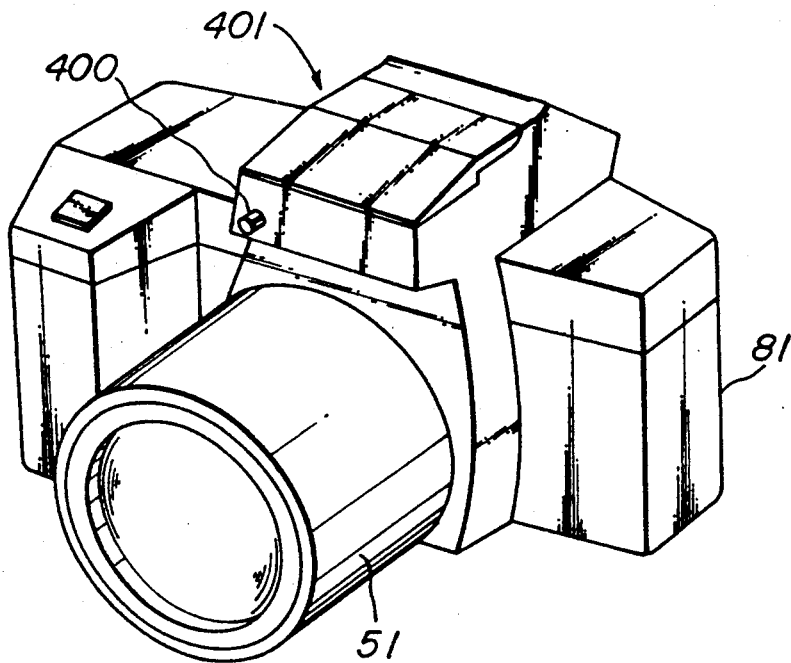
FIG_1B
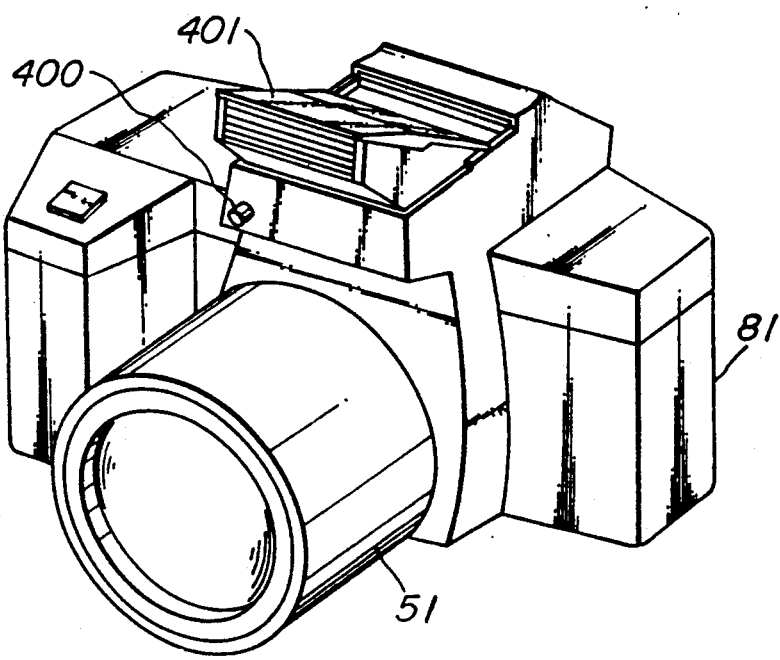

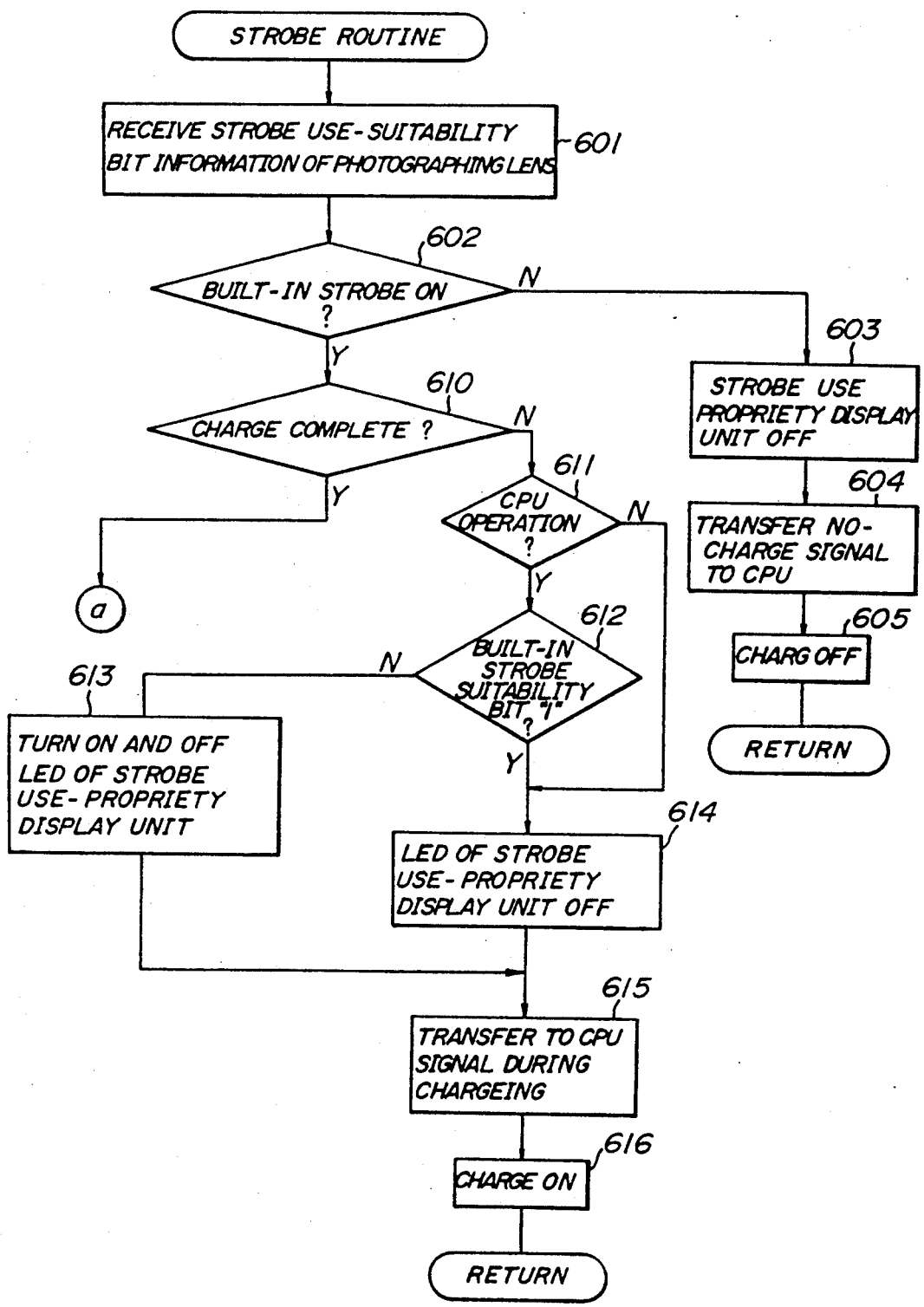
FIG_5A

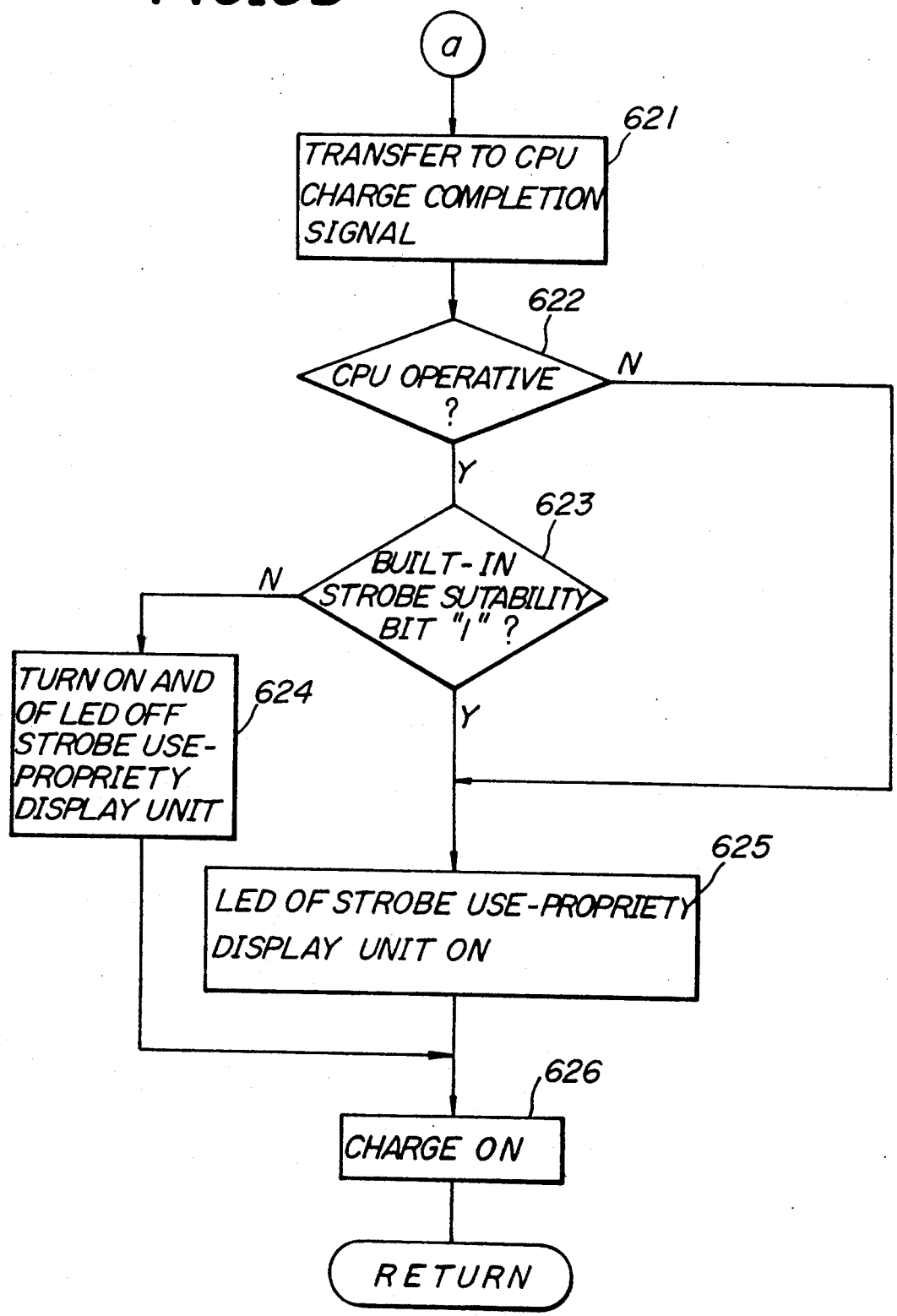

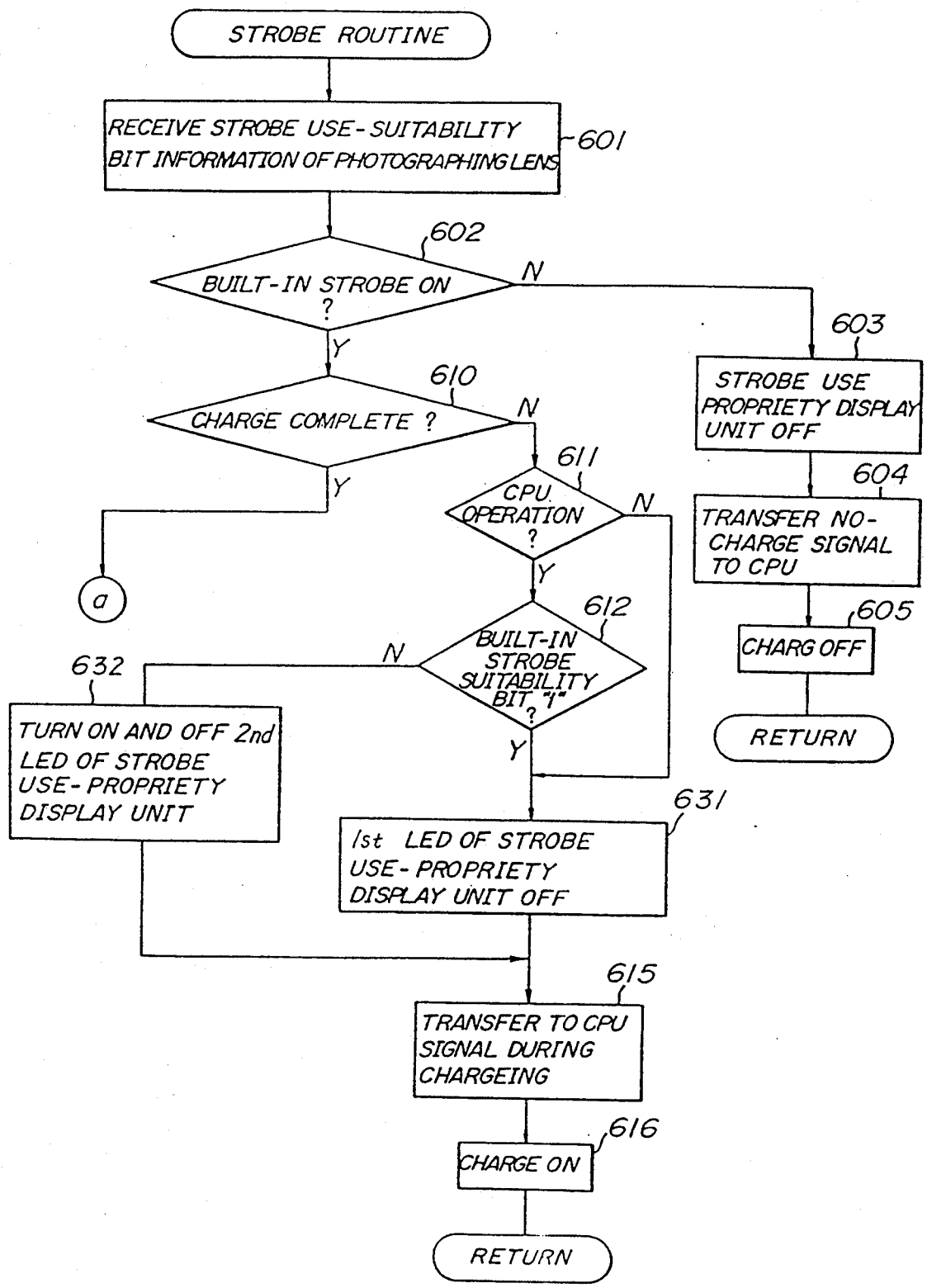

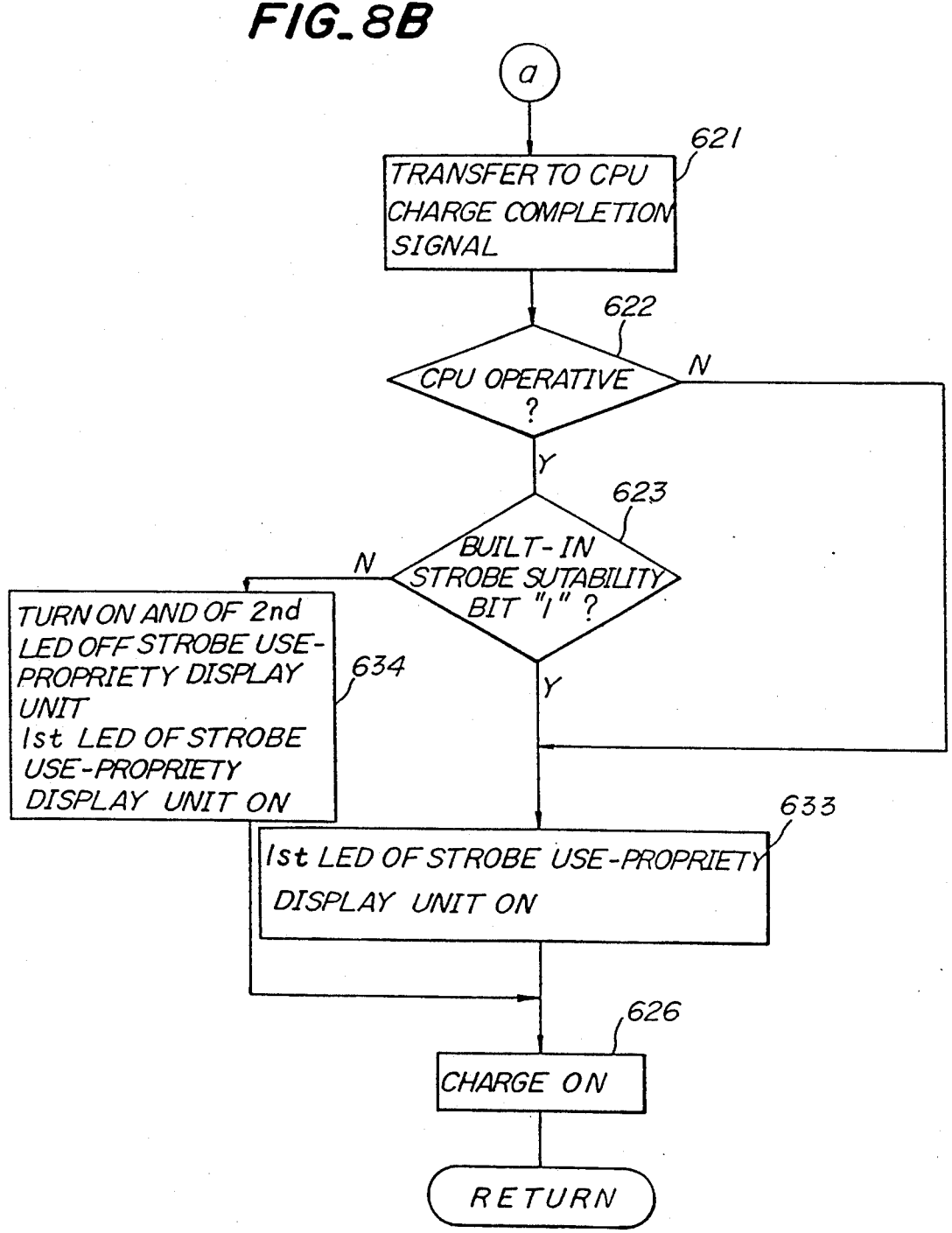

CAMERA HAVING A BUILT-IN STROBE AND LENS FOR USE THEREWITH

This application is a continuation of application no. 07/412,556, filed Sept. 25, 1989, pending, which is a continuation of application No. 07/148,999, filed on Nov. 27, 1988, now abandoned.

BACKGROUND OF THE INVENTION

This invention relates to a camera having interchangeable lenses and strobe built therein, and more particularly to a strobe built-in camera capable of dealing with the fact that an object to be photographed is not effectively irradiated by light from the built-in strobe owing to an outer shape and a focal length of the photographing lens.

One method of helping photographing an object poor in luminance is used of a strobe improving the luminance of the object. Cameras utilizing strobes are divided into two kinds. One has a strobe built therein, while the other has a construction onto which a separately prepared strobe is mounted.

A typical strobe built-in camera is a lens shutter camera. With the camera of this kind, an outer shape and focal length are not greatly changed. Therefore, it is an easy matter to bring the strobe and the lens into a proper relation in a manner that a photographing zone of the camera or a field of view of the lens is within a spreading zone of the strobe light and the outer shape of the lens does not obstruct the strobe light. Accordingly, there is no trouble in photographing in case of lens shutter cameras.

On the other hand, with cameras with interchangeable lenses, various lenses are used according to photographing purposes. Among these photographing lenses, there are those having large diameters, long overall lengths or different fields of view due to different focal lengths. In case that a strobe is built in a camera body of a lens interchangeable camera, if the photographing lens mounted on the camera body has a large diameter or a long overall length, part of all of the strobe light incident upon an object may be obstructed by the photographing lens itself. Moreover, in case of a wide angle lens being mounted on the camera, spreading zone of the strobe light may be often narrower than the field of view of the lens.

In the event that photographing is effected under such an objectionable conditions, a required picture could not be obtained, while films are superfluously consumed in any cases.

SUMMARY OF THE INVENTION

It is an object of the invention to provide a strobe built-in camera which eliminates all the disadvantages of the prior art above described and which is capable of warning of the use of a strobe according to kinds of photographing lens and prohibiting the use of the strobe as the case may be.

In order to achieve this object, the strobe built-in camera including a camera body having a strobe built therein and at least one photographing lens to be detachably mounted on the camera body according to the invention comprises strobe use-warning means for warning unsuitability use of said strobe in case of either that said photographing lens mounted on the camera body reduces a quantity of light emitted from said strobe to a value less than a correct quantity of light incident upon an object and that a spreading zone of the light from the strobe is narrower than a field of view of said photographing lens.

In carrying out the invention, a strobe use-propriety display unit preferably commonly displays the warning of the unsuitability of use of the strobe as well as completion of charging the strobe.

With this arrangement, when an interchangeable lens unsuitable for use of the built-in strobe is mounted on the camera, warning of the unsuitable lens is effected and the flashing of the strobe is prohibited as the case may be.

The invention will be more fully understood by referring to the following detailed specification and claims taken in condition with the appended drawings.

BRIEF DESCRIPTION OF THE DRAWINGS

FIGS. 1A and 1B are perspective views for explaining the built-in strobe associated with the invention;

FIGS. 5A and 5B are flow diagrams illustrating operations of the IPU of the strobe built-in camera according to the invention, particularly associated with the strobe;

FIGS. 8A and 8B are flow diagrams illustrating operation of the IPU of the strobe built-in camera of FIG. 6.

DESCRIPTION OF THE EMBODIMENT

Figure 2:
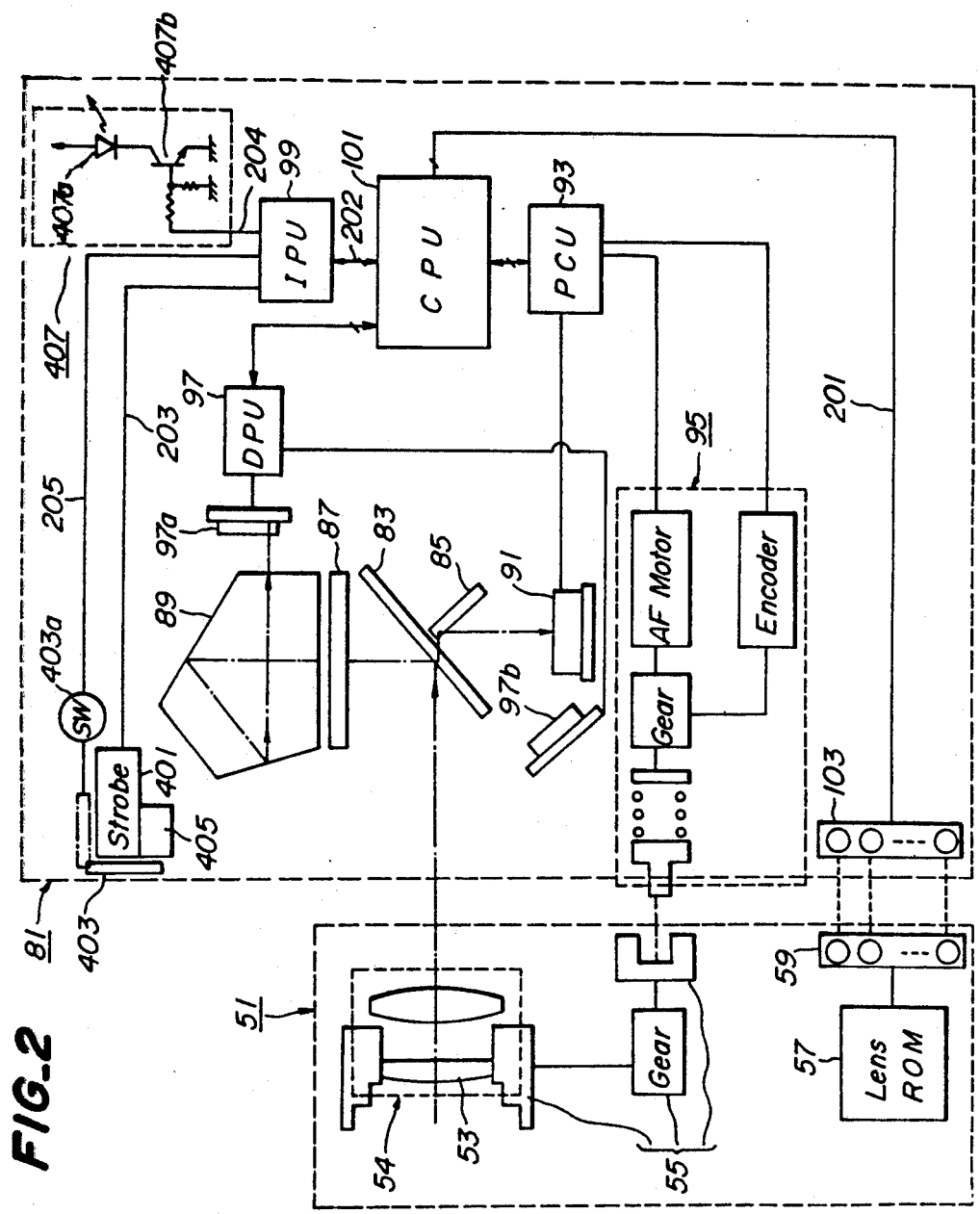
FIG. 2 is a block diagram schematically illustrating one embodiment of the strobe built-in camera according to the invention.

The attached drawings illustrate embodiments of the invention schematically within a range sufficient to understand the invention and it is of course that the invention is not limited to those shown in the drawings with respect to sizes, shapes and positional relations of components of the invention. Like components are designated by the same reference numerals in those drawings.

The strobe built-in camera according to the invention is characterized in the provision of strobe use warning means for warning unsuitability of use of a strobe built in the camera and prohibiting the use as case may be in the event that a photographing lens mounted on the camera reduces the quantity of strobe light to a value less than a proper quantity for an object or a spreading zone of the strobe light is narrower than a field of view of the photographing lens. In this embodiment, such a means is applied to an automatic focusing (AF) camera including a lens ROM built-in lens. However, it should be understood that the invention is applicable to cameras with interchangeable lenses other than the camera in the embodiment.

CONSTRUCTION OF CAMERA

First, description is given to the first embodiment of the present camera.

FIGS. 1A and 1B are schematic perspective views for explaining a retractable strobe provided in the strobe built-in camera according to the invention. Referring to these drawings, the camera comprises a camera body 81 and a photographing lens 51 mounted on the camera body 81. The retractable strobe 401 is built in the camera body 81 at a location above a pentagonal prism and substantially at a center of the camera so that an object is easily irradiated by light emitted from the strobe. A light emitting portion of the strobe is retracted in the camera body when it is not used. Upon pressing a push button 400, the light emitting portion of the strobe pops up or extends out of the camera body 81. As such a built-in strobe is disclosed in United States patent application Ser. No. 934,055, the strobe will not be described in further detail.

FIG. 2 is a block diagram schematically illustrating one example of the strobe built-in camera according to the invention. Components which would not be essential for an understanding of the invention among those of the camera and lens will not be described in detail.

FIG. 2 illustrates a photographing lens 51 and a camera body 81 on which the lens 51 is mounted. The lens 51 may be various ones different in external shape and focal length according to purposes of photographing.

The photographing lens 51 comprises a lens system 54 including a lens 53 movable along an optical axis for focusing and a driving force transmission mechanism 55 for transmitting driving force from a driving source in the camera body 81 to the movable lens 53. The lens 54 further comprises a lens ROM 57 including information of stop of the photographing lens 51, position of the movable lens 53 and use-propriety, that is, warning or prohibiting of the strobe built in the camera body, and a group of electric contacts 59 on the lens side for electrically connecting between the photographing lens 51 and the camera body 81.

On the other hand, the camera body 81 comprises an optical system such as a main mirror 83, a submirror 85, a focussing screen 87, a pentagonal prism 89 and the like, a pickup portion 91 for the automatic focusing, a driving mechanism 95 for driving the movable lens 53 in the photographing lens 51 and an AF control (simply referred to as PCU) 93 for controlling the pickup portion 91 and the driving mechanism 95. Moreover, the camera body 81 comprises light receiving elements 97a and 97b and an AE control (simply referred to as DPU) 97 for AE (automatic exposure controlling), and a display control (simply referred to as IPU) 99 for controlling display operation indicating the various operations of the strobe and the camera. The camera body 81 further comprises a central processing unit (CPU) 101 for controlling the PCU 93, DPU 97, IPU 99 and lens ROM 57 on the photographing lens side, and a group of electric contacts 103 on the camera body side corresponding to the group of electric contacts 59 on the lens side.

A strobe 401 is built in the camera body 81 at a suitable position for example on an upper side of a pentagonal prism in the camera body so as to permit an object to be sufficiently irradiated by the light from the strobe as above described. Reference numeral 403 denotes a cap covering the strobe when it is not used. Reference numeral 403a shows switch means generating judgement signals for judging the opened and closed conditions of the cap 403 of the strobe 401, which conditions correspond to operator's intention using or not using the strobe. In case that a retractable strobe is built in the camera body 81, the cap 403 is not needed and accordingly the switch means 403a is designed such that when the retractable strobe is popped up out of the camera body 81 the switch means 403a generates a judgement signal indicating operator's intention using the retractable strobe. In this camera, an auxiliary light emitting portion 405 for the automatic focusing is provided in the proximity of the strobe. A display unit 407 displays whether the strobe may be used or not, whose function will be explained later. The display unit 407 in this embodiment comprises a light emission diode (LED) 407a and a transistor 407b. The LED 407a is positioned at a location for example in the proximity of the finder of the camera where an operator can easily notice the LED 407a so that the operator correctly know conditions of the strobe. Moreover, the strobe 401 and the display 407 are controlled by the IPU 99.

Further, the camera is provided at a suitable position on the camera body 81 with a contact (not shown) for connecting an external strobe prepared other than the built-in strobe 401.

STROBE USE—WARNING MEANS

With such a camera constructed as above described, the spreading zone of the light from the built-in strobe is previously known. It is also previously examined which photographing lens or lenses among a plurality of photographing lenses (interchangeable lenses) to be mounted on the camera have outer shapes reducing the quantity of light incident upon the object to a quantity less than a proper quantity of strobe light, or which interchangeable lens or lenses have fields of view wider than the spreading zone of the strobe light. As a result, the photographing lenses unsuitable for using the strobe built in the camera can be determined.

Moreover, as the above photographing lens 51 has the ROM 57, the information whether the photographing lens 51 having the ROM is suitable for using the built-in strobe or not can be previously stored in part of the lens ROM. This is carried out in the manner that when a predetermined bit in the lens ROM is "1", the strobe can be used with the photographing lens, while when the predetermined bit is "0", the strobe cannot be used with the lens.

Therefore, the photographing lens having the lens ROM 57 with such information stored therein can be used as part of means for warning the use of the built-in strobe according to kinds of photographing lens. In this case, the strobe use-warning means consists mainly of the photographing lens 51, the CPU 101, the IPU 99, switch means 403a generating judgement signals for judging the opened and closed conditions of the cap 402 of the strobe 401, and the strobe use-propriety display unit 407. In case of a retractable strobe, however, as is already explained the switching means 403a generates a signal indicating that the retractable strobe is in the to be used condition.

Figure 3:
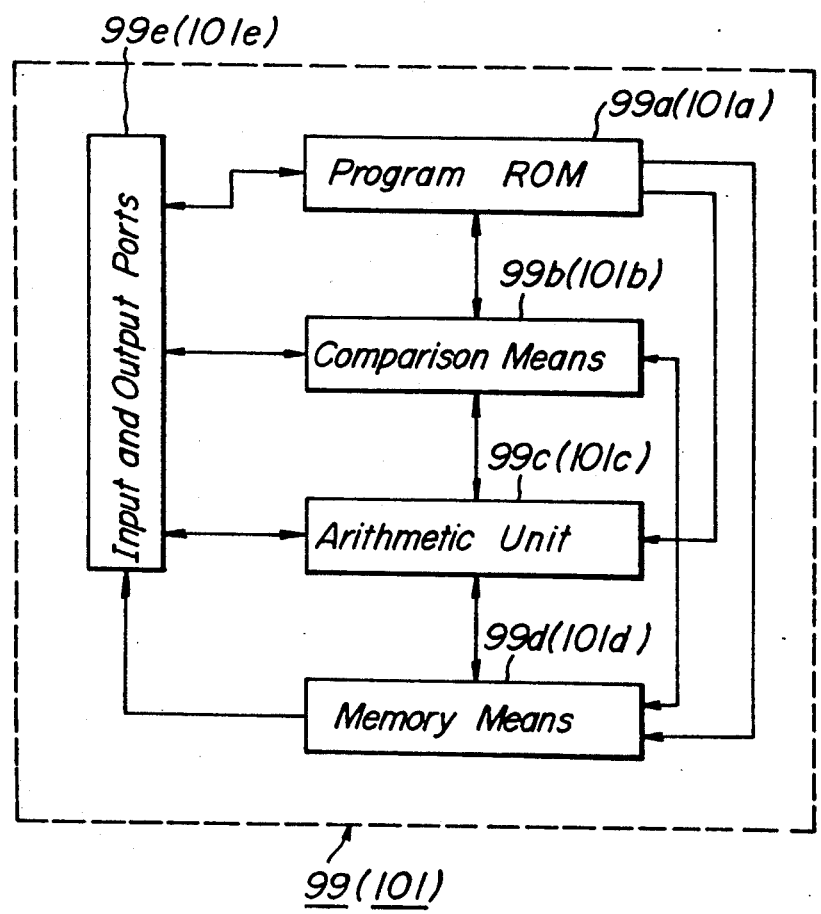
FIG. 3 is a block diagram illustrating functions and means of CPU and IPU provided in the strobe built-in camera of the embodiment of the invention.

In this embodiment, moreover, the IPU 99 and the CPU 101 are so constructed as to operate in the manner as described hereinafter. FIG. 3 is a block diagram for explaining functions of the IPU 99 and CPU 101. The IPU 99 comprises a program ROM 99a, a comparison means 99b, an arithmetic unit 99c, memory means 99d and input and output ports 99e. The CPU 101 also comprises those similar to all the components of the IPU 99. Connections between the CPU 101 and IPU 99 and between these and other components are effected through the input and output ports 99e.

Moreover, connections between the components of the strobe use-warning means in this embodiment are carried out in the following manner. There is provided a signal line 201 between the CPU 101 and the lens ROM 57 for transferring serial clocks and serial data. There are provided a control line and for example a four bit bus line typically shown by 202 between the CPU 101 and the IPU 99. Between the built-in strobe 401 and IPU 99, a signal line 203 is provided for receiving and transmitting strobe charge command signals, charge completion signals, flash command signals and the like. A signal line 204 for display operations is provided between the IPU 99 and the strobe use-propriety display unit 407. Moreover, the operator's intention whether one uses the strobe or not is transmitted through a signal line 205 to the IPU 99 by switch means 403a. In the example shown by FIG. 2, the switch means 403a generates high and low signals in response to the opening and closing of the cap 403. However, in case where a retractable strobe is built in the camera body, the switch means 403a generates high or low signals in resoponse to the popping up or retracting of the strobe.

OPERATION OF STROBE BUILT-IN CAMERA

Figure 4:
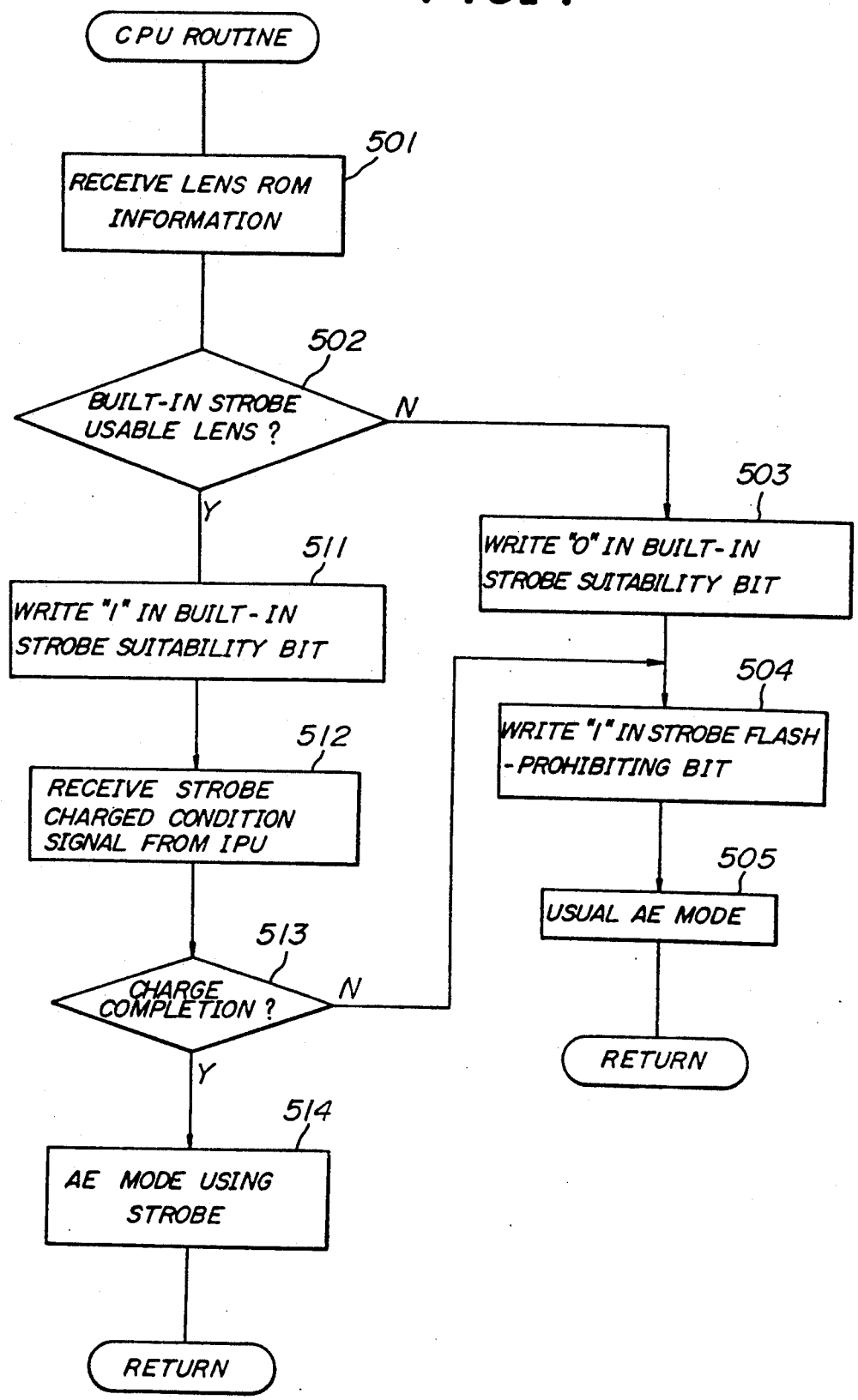
FIG. 4 is a flow diagram illustrating operations of the CPU of the strobe built-in camera according to the invention, particularly associated with the strobe.

The operation of the strobe built-in camera of the above embodiment, particularly charge of used condition of strobe according to kinds of photographing lens to be mounted on the camera body will be explained by referring to FIGS. 2, 4 and 5A and 5B. FIG. 4 is a flow diagram illustrating the operation of programs associated with the strobe among programs stored in the CPU 101. FIGS. 5A and 5B are flow diagrams illustrating the operation of programs associated with the strobe among programs stored in the IPU 99. These programs may be stored in the program ROM 99a and 101a of the CPU or IPU.

When a serial clock is fed from the CPU 101 to the lens ROM 57, the CPU 101 receives a lens information according to the clock (step 501). This lens information includes the information showing whether the strobe built in the photographing lens may be used or not. According to this information, an information is written in a built-in strobe use-propriety bit of the memory means 101d in the CPU 101. For example, when the photographing lens capable of using the built-in strobe is mounted on the camera, "1" is written in the propriety bit (steps 502 and 511). On the other hand, when the photographing lens mounted on the camera is unsuitable for using the built-in strobe owing to a shape and a focal length of the lens, "0" is written in the propriety bit (steps 502 and 503). In the latter case, "1" is written in a strobe flash prohibiting bit in the CPU (step 504).

In case that "1" has been written in the strobe flash prohibiting bit in the step 504, the strobe flashing can be prohibited until the "1" turn to "0". Moreover, in the event that a photographing lens unsuitable for using a built-in strobe is mounted on the camera, a photographing mode can be selected, which control an exposure as usual without using the strobe (step 505). Moreover, it is possible to warn the unsuitable photographing lens so as to avoid erroneously pressing a shutter button, notwithstanding the unsuitable photographing lens is mounted. Such a warning is effected mainly with the aid of the IPU 99 in this embodiment, which will be explained in detail in connection with operation of the IPU 99 later described.

If the photographing lens 51 mounted on the camera body 81 is suitable for using the built-in strobe in the step 502, the photographing using the strobe is effected after ascertaining whether the built-in strobe can be used. Such an ascertaining is mainly effected with the aid of the IPU 99 in this embodiment. The photographing using the strobe will be explained in connection with the later explanation of the operation of the IPU 99.

On the other hand, in communication of the IPU 99 with the CPU 101, the memory means in the IPU 99 receives with a constant interval the information of the built-in strobe use-propriety bit from the memory means in the CPU 101 (step 601 refer to FIG. 5A, hereinafter).

Moreover, the IPU 99 judges whether the operator intends to use the built-in strobe (ON condition) or not (step 602). In this embodiment, it has been constructed that when the cap 403 for the strobe is opened, the switch means 403a made optically, magnetically, mechanically or in other modes is operated so that an ON signal is input into the IPU 99 as above described. In case that a retractable strobe is built in the camera body 81, when the retractable strobe is popped up, the switch means 403a is operated like that described above.

IN CASE OF NO INTENTION OF USE

When the built-in strobe 401 is not used (the cap being closed) or when the retractable strobe is retracted in the camera, the strobe use-propriety display unit 407 is off (step 603) and a signal signifying that charging has not been effected is transferred from the IPU 99 to the CPU 101 (step 604). Moreover, a charging OFF signal is output from the IPU 99 into the built-in strobe 401 (step 605).

IN CASE OF INTENTION OF USE

In case that the built-in strobe 401 is on, judgement whether strobe charge has been completed or not is than effected (step 610). This is accomplished for example by the IPU 99 monitoring detection signals from a charge voltage detecting circuit provided in the strobe.

(1) Incomplete charge

When the charge has not been completed, judgement whether the CPU 101 actuates or not is first effected (step 611). In this manner, it can be ascertained whether the built-in strobe use-suitability bit information and the strobe flash-prohibiting bit information are correctly memorized in the memory means in the CPU 101.

When the CPU 101 is operating, judgement whether the photographing lens is suitable for using the built-in strobe is then carried out (step 612). At this time, if the strobe use-suitability bit is "0", the photographing lens mounted on the camera is judged to be unsuitable and the IPU 99 rapidly feeds for example interrupted warning signals of a predetermined period to the strobe use-propriety display unit 407. Therefore, the LED of the strobe use-propriety display unit 407 repeatedly turns on and off to provide warning so that the operator knows the fact that the unsuitable lens is mounted on the camera. The IPU 99 feeds to the CPU 101 signals indicating the fact that charging is being effected (steps 612, 613 and 615).

When the photographing lens is judged to be suitable for using the built-in strobe 401 in the step 612 or when the CPU 101 is judged to be inoperative in the step 611, the LED turns off in the step 614. Moreover, the IPU 99 feeds to the CPU 101 signals indicating the fact that charging is being effected in the step 615.

An operation is then effected for charging the strobe (step 616).

(2) Completion of charge

When the completion of charging of the built-in strobe 401 is judged in the step 610, the IPU 99 feeds charge completion signals to the CPU 101 (step 621).

Thereafter, judgement whether the CPU 101 is operating or not is effected (step 622) in the similar manner as in the step 611.

In case that the CPU 101 is operating, the judgement whether the photographing lens is suitable for using the built-in strobe is then effected (step 623). The built-in strobe use-suitability bit is "0", the LED 407a of the strobe use-propriety display unit 407 turns on and off with a predetermined period in the same manner as in the step 613 so as to warn the operator of the fact that the unsuitable photographing lens has been mounted on the camera (step 624). On the other hand, if the built-in strobe use-suitability bit is "1" or the CPU 101 is judged to be inoperative in the step 622, the LED 407a is turned on, thereby informing the operator that the built-in strobe can be used (steps 622, 623 and 625). In this manner, by using one LED 407a of the strobe use-propriety display unit 407, it is possible to display the completion of strobe charge and the prohibition of use of the strobe. In this case, moreover, the signal for charging the built-in strobe 401 is output from the IPU 99 onto the strobe side in consideration of continuous use of the built-in strobe 401 (step 626).

In contrast with the operation of the IPU 99 above described, the CPU 101 monitors with a predetermined interval the signals with respect to the charged conditions of the strobe, or completely charged, charge proceeding or discharged condition (step 512 in FIG. 4). Upon receipt the signal of completion of charge from the IPU, the photographing is effected using the built-in strobe under the automatic exposure control (steps 513 and 514 in FIG. 4).

The operations of the IPU 99 and CPU 101 above described are carried out mainly by processing in the arithmetic units 99c and 101c and the comparison means 99b and 101b.

Moreover, the invention is not limited to the above embodiment. For example, information whether the photographing lens is suitable for using the built-in strobe are written in the lens ROM of the photographing lens in the above embodiment. The information may be effected electrically, mechanically and optically other than the method in the embodiment according to constructions of cameras.

The construction of the strobe flash prohibiting means is not limited to that in the embodiment. Other hard or soft constitutions may be used for the means within the scope of the object of the invention.

The aforesaid explanation is given to the first embodiment of the camera in accordance with the present invention. In the first embodiment, the camera is so designed that when the photographing lens is unsuitable for using the built-in strobe, warning is provided to the operator and at the same time the strobe flashing is automatically inhibited. However, in a second embodiment of the present invention, the camera is designed such that, though the warning operation like that of the first embodiment is held, the operator can select strobe flashing or no strobe flashing at will based upon the operator intention.

In the second embodiment, it is preferable that the construction and operation of the camera is partially altered as described hereinbelow.

EXPLANATION OF THE ALTERED PORTION OF THE CONSTRUCTION

Figure 6:
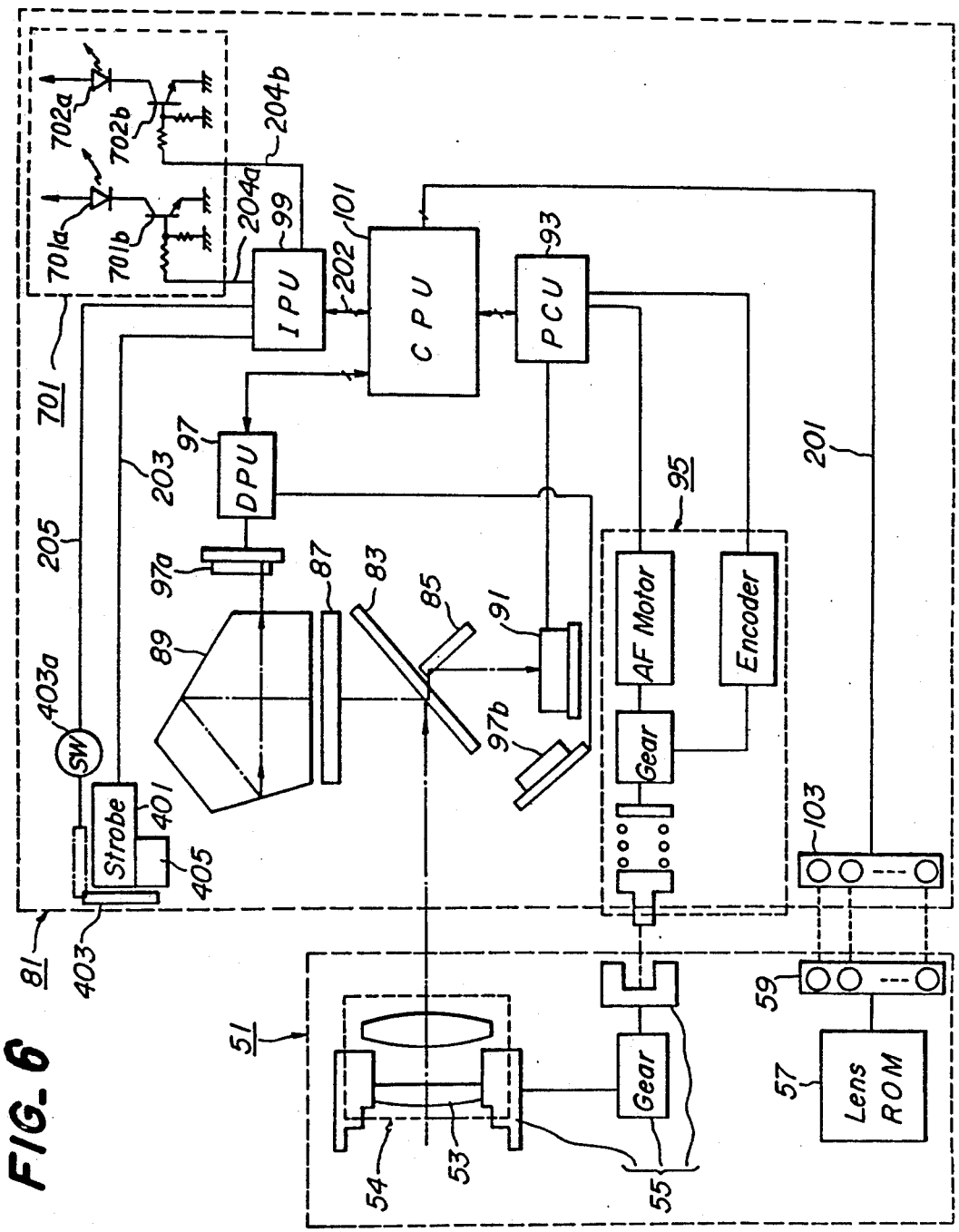
FIG. 6 is a block diagram schematically illustrating another embodiment of the strobe built-in camera according to the invention.

FIG. 6 is a block diagram showing the second embodiment of the present invention. In this embodiment, it may be arisen, in some cases, that the warning indication and charge completion indication are required at the same time. To satisfy this requirement, in this embodiment, as is apparent from FIG. 6, a strobe use-propriety display unit 701 comprises first indication means (701a, 701b) for the warning indication and second indication means (702a, 702b) for the charge completion indication, which is different in construction from the strobe use-propriety display unit 407 shown in FIG. 2. The first and second indication means are connected to the given terminals of the IPU 99, respectively. The remaining portion of the construction shown by FIG. 6 is the same as the corresponding portions the construction of the first embodiment shown by FIG. 2.

EXPLANATION OF THE ALTERED PORTIONS OF THE CPU ROUTINE

Figure 7:
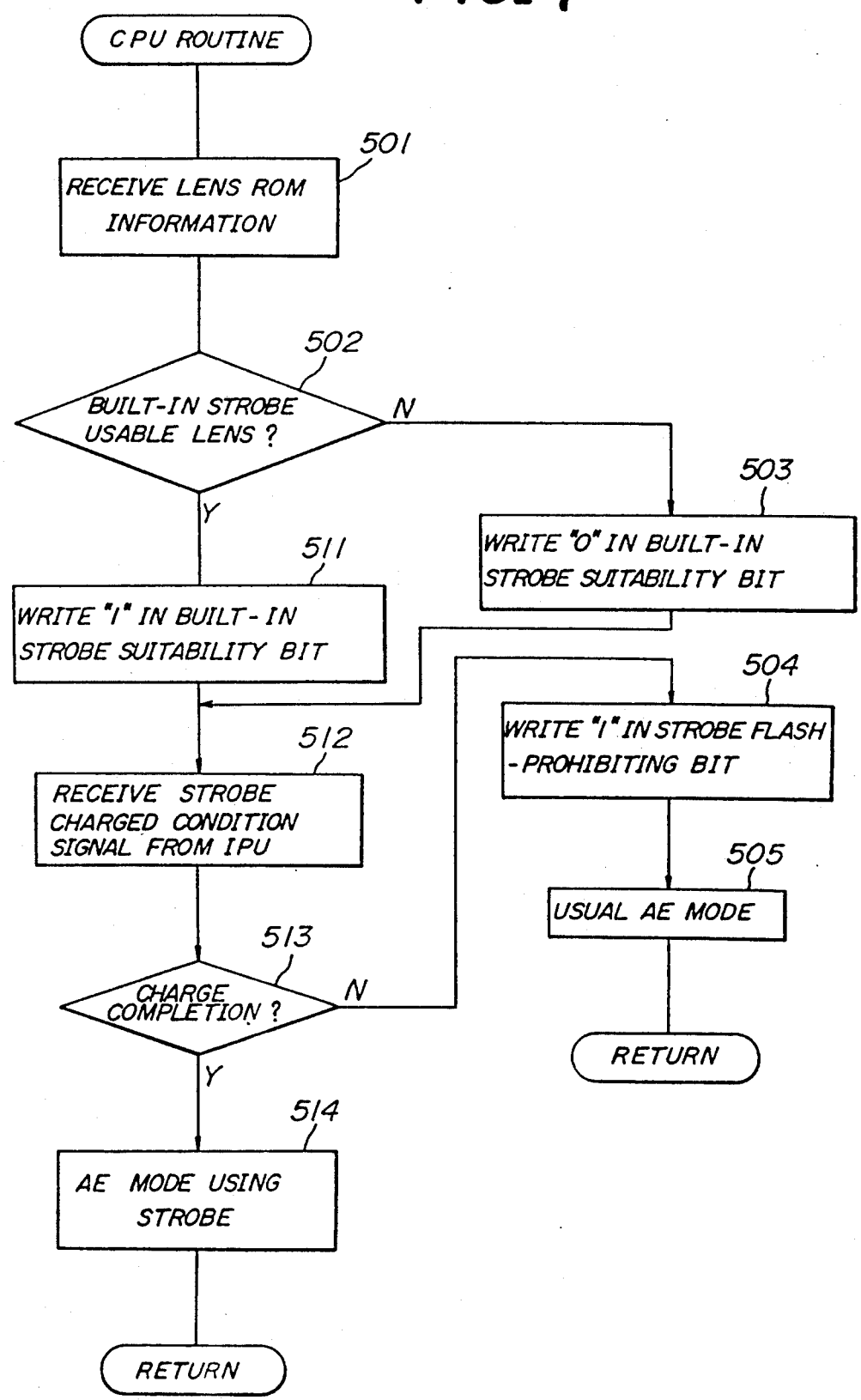
FIG. 7 is a flow diagram illustrating operations of the CPU of the strobe built-in camera of FIG. 6.

FIG. 7 is a flow diagram showing operation of the CPU according to the second embodiment of the present invention. As already explained with reference to FIG. 4, according to the flow of the CPU routine of the first embodiment, the operation at the step 504 is carried out directly after the operation at the step 503. In the second embodiment, however, in order to prevent the automatical inhibitation of the strobe flashing, the operation at the step 512 is followed by that at the step 503. Other portions of the flow of the CPU routine is the same as that of the first embodiment.

EXPLANATION OF THE ALTERED PORTION OF THE STROBE ROUTINE

FIGS. 8A and 8B are flow diagrams for explaining the operation according to the strobe routine of the second embodiment. The description will be given to the portions of the flow of the second embodiment which are different from those of the first embodiment.

In the second embodiment, the first indication means (701a, 701b) is turned off at the processing of the step 631 shown in FIG. 8A corresponding to the step 614 of the first embodiment. Further, the second indication means (702a, 702b) is turned on and off at the proceeding of the step 632 shown in FIG. 8A corresponding to the step 613 of the first embodiment. Still further, the first indication means is turned on at the processing of the step 633 shown in FIG. 8B corresponding to the step 625 of the first embodiment. Still further, the first indication means is turned on and at the same time the second indication means is turned off at he processing of the step 634 shown in FIG. 8B corresponding to the step 624 of the first embodiment. The remaining portions of the flow other than that described above is the same as that of the first embodiment.

As can be seen from the above explanation, the strobe built-in camera according to the invention is capable of warning of the photographing lens being unsuitable for using the built-in strobe and moreover prohibiting the flashing of the built-in strobe, when the photographing lens to be used will interrupt part or all of strobe light incident upon an object owing to a large diameter or long length of the lens or the photographing lens has a field of view wider than the spreading zone of the strobe light.

Therefore, photographing under inappropriate photographing conditions is prevented and superfluous use of films can be avoided.

While the invention has been particularly shown and describes with reference to preferred embodiments thereof, it will be understood by those skilled in the art that the foregoing and other changes in form and details can be made therein without departing from the spirit and scope of the invention.

What is claimed is:

1. A camera and a strobe in combination, said combination comprising:
   a camera body;
   a strobe that is usable with said camera body; and
   means for warning of an unsuitability of using said strobe when a determination is made that a photographic lens that is detachably mounted to said camera body may obstruct a portion of light emitted from said strobe that is to be projected onto an object to be photographed.

2. A camera and strobe in combination as set forth in claim 1, further comprising a strobe use-propriety display unit for displaying a warning of the unsuitability of the use of said strobe and for displaying a completion of a charging of said strobe.

3. A camera and strobe in combination as set forth in claim 1, wherein said strobe-use warning means prohibits the use of said strobe when said strobe-use warning means warns of said unsuitability of the use of said strobe.

4. A camera and strobe in combination as set forth in claim 2, wherein said strobe use-propriety display unit comprises a first indication means for warning of the unsuitability of said use of said strobe and a second indication means for indicating said completion of said charging of said strobe.

5. A camera and strobe in combination as set forth in claim 3, further comprising a strobe use-propriety display unit for displaying a warning of the unsuitability of said use of said strobe and for displaying said completion of charging of said strobe.

6. A camera and strobe in combination as set forth in claim 1, further comprising a central controller for receiving information indicating that at least a portion of said strobe light emitted by said strobe to be projected upon an object to be photographed may be obstructed by said photographic lens.

7. A camera and strobe in combination as set forth in claim 6, wherein said strobe-use warning means includes means for determining whether the use of said strobe is unsuitable.

8. A camera and strobe in combination as set forth in claim 7, wherein said determining means bases its determination on said received information.

9. A camera and strobe in combination as set forth in claim 1, wherein said strobe is integrally connected to said camera body.

10. A camera and strobe in combination as set forth in claim 1, wherein said strobe is built into said camera body.

11. In combination, a single-lens reflex camera and strobe, and a photographic lens that is detachably mounted to said camera, said photographic lens comprising a photographic lens system and a memory for storing information indicating that at least a portion of a light to be emitted from said strobe and projected upon an object to be photographed may be obstructed by said photographic lens, said camera comprising a central controller for receiving said information from said photographic lens, means for determining whether a use of said strobe is unsuitable, based upon said received information, and means for warning of an unsuitability of the use of said strobe based upon the result of said determining means.

12. The combination as set forth in claim 11, said camera further comprising:
   a strobe use-properiety display unit;
   means for generating a signal indicating an intention to use said strobe; and
   a display controller that causes said strobe use-propriety display unit to display a warning, based upon said received information, when said generating means indicates an intention of using said strobe.

13. The combination as set forth in claim 12, wherein said strobe use-propriety display unit comprises:
   a light emitting diode;
   a transistor circuit; and
   a warning signal that is periodically supplied to said transistor circuit by said display controller in response to said received information so as to cause said light emitting diode to alternately flash ON and OFF so as to display the unsuitability of using said strobe.

14. The combination as set forth in claim 12, further comprising second means for determining whether said strobe is charged, wherein said strobe use-propriety display unit is activated when said second determining means has determined that said strobe is charged and said determining means has determined that the use of said strobe is unsuitable.

15. The combination as set forth in claim 13, further comprising second means for determining whether said strobe is charged, wherein said strobe use-propriety display unit is activated when said second determining means has determined that said strobe is charged and said determining means has determined that the use of said strobe is unsuitable.

16. The combination as set forth in claim 12, wherein said means for generating said signal indicating an intention of using said strobe is activated by moving said strobe to an open position.

17. The combination as set forth in claim 12, wherein said strobe comprises a retractable strobe, and said means for generating said signal indicating an intention of using said retractable strobe generates said signal when said retractable strobe is popped up out of said camera body.

18. The combination as set forth in claim 17, wherein said means for generating said signal comprises a switch.

19. The combination as set forth in claim 11, wherein said strobe is integrally connected to said camera body.

20. The combination as set forth in claim 11, wherein said strobe is built into said camera body.

* * * * *